Patented Oct. 22, 1929

1,732,816

UNITED STATES PATENT OFFICE

IRVING F. LAUCKS, HARRY P. BANKS, AND HUGH F. RIPPEY, OF SEATTLE, WASHINGTON, ASSIGNORS TO LAUCKS LABORATORIES, INC., OF SEATTLE, WASHINGTON, A CORPORATION OF WASHINGTON

METHOD OF CLEANSING AND PREPARING FOR STORAGE AND MARKET, FRUIT AFTER HARVESTING

No Drawing.　　　Application filed October 11, 1926. Serial No. 141,028.

Our invention relates to the method of cleansing and preparing for storage and market, fruit after harvesting. More particularly our invention relates to the removing from the fruit after harvesting poisonous spray residues that may remain thereon.

It is well recognized that fruit, such as apples, pears, quinces, plums, prunes, oranges, grapefruit, lemons, etc., must be sprayed to preserve them against insects and fungous growth. Generally these sprays contain a poisonous chemical such as, for example, arsenic, and it has become a matter of great importance that the public be assured of the removal of any possible residue of such sprays.

Our invention will be described particularly as applied to apples, but it is to be expressly understood that our invention is not limited to any such specific application, but extends to all fields where like problems and conditions obtain. Foreign governmental authorities require that the apples shall be freed of any arsenic in excess of one one hundredth (.01) grains per lb. of fruit, and this maximum allowance, we are informed, is tentatively adopted by the Department of Agriculture of our own country pending further investigation. Heretofore mechanical devices have been provided for wiping the fruit, but this does not accomplish the removal of the arsenic on account of the wax coating that is developed upon the apple skin, as the fruit's natural protection against undue evaporation and as a protective coating generally. The arsenic residue may lie beneath the wax coating as well as under and on top of said coating. The wiping operation, therefore, fails to reach that part of the spray residue that may adhere close to the apple under the wax coating.

Furthermore, such wiping of the fruit may result in transferring the poison from one apple to another that may not have any poison thereon. Also, a manifest serious objection obtains to such method of wiping in that it cannot remove the spray residue which may adhere within the stem and blossom pits.

A primary requisite of all means and processes for the removal of this spray residue containing arsenic is that the apples shall not be damaged either as to appearance, keeping qualities or flavor.

Our investigation reveals the fact that the coatings on these apples at the time of harvesting may be of a varied nature. For instance, they may be composed of residue from calcium arsenate spray, lead arsenate spray, Bordeaux mixture, sulphur spray, mineral or vegetable oil sprays, soaps, spreaders and combinations of two or more of these and other poisonous or objectionable residue. All of these combinations are found in the sprays employed on the trees, and on the fruit, to eradicate or control insect pests, fungous growth etc.

The problem is further complicated by the fact that the apples are coated with dust as well as the natural wax of the apple which is exuded to seal the pores and preserve the fruit from too rapid decay, as well as evaporation.

We have learned by trial and by experience of the fruit packers, that wiping of the apples with cloths or brushes either dry or in water baths or sprays, is not sufficiently effective, as the coatings are not removed to the extent necessary without great pains and effort with each individual apple, and not always even then, for reasons hereinabove set forth. This individual treatment of the apple is manifestly excessively expensive.

Our investigations have led to the conclusion that if the fruit is treated with a bath of some chemical solution which would serve to loosen the wax coatings on the apples and emulsifiy the spray residues, they could then be easily and quickly removed by subsequent baths in either quantities of fresh solution of the same or other chemicals followed by a clear water.

A primary requisite of such chemical solution is that it shall not harm the appearance or the keeping qualities of the fruit.

A further requisite is that the chemical or chemicals used must be sufficiently tasteless to be unnoticeable in any concentrations which may possibly be left upon the fruit after thorough washing, and such concentrations must be entirely harmless.

A further requisite is that the chemical or chemicals used must be cheap and readily obtainable in quantities.

A further requisite is that the chemical or chemicals used must be easy and simple to mix and handle.

In thus treating the apple to remove the spray residues it will be observed it is necessary to remove the natural wax coating of the apples which is essential for the proper keeping and preservation of the fruit since said coating insulates the pores of the fruit skin from the air whereby evaporation of the juices of the apple is prevented. Hence, a further requisite of any process employing a solution of chemicals and subsequent baths for the removal of the solutions, emulsions, residues, etc., which operate to remove the wax coating while eliminating objectionable spray residues, must also provide for leaving the fruit in such condition that it can readily be supplied with a satisfactory protective coating instead of the natural wax of the apple. The importance of this is manifest when it is remembered that the fruit must be packed, stored and shipped so that a long period of time, even months in duration, may lapse before the fruit reaches the consumer.

We have discovered that a solution of trisodium phosphate in water in concentration of from one per cent to ten per cent is very efficient and otherwise satisfactory for meeting the requirements outlined above. Such a solution operates as an emulsifying agent both as respects the wax coating and as respects the objectionable spray residues. The solution may be either cold or warm, but, of course, should not be such a warm temperature as to affect the cell structure of the apple.

We have also found that sodium borate and sodium and potassium carbonate may be satisfactorily substituted for the trisodium phosphate at least in part for the purpose of providing mild alkalinity without having the special property of emulsifying action, thus providing to the extent of the substitution a less expensive cleansing action. We do not wish to limit ourselves to these specific chemicals but claim as equivalents all alkaline salts of low alkalinity in solutions of such strength as do not exceed the degree of alkalinity of ten per cent solution of trisodium phosphate. In general, this would include alkaline salt solutions having a pH of not greater than thirteen. We particularly note and specifically claim trisodium phosphate because it is not only efficient chemically but it is harmless, cheap and readily obtainable.

Moreover, we have discovered that instead of using a solution of one of the alkaline salts noted, or mixtures of one or more of those named, we may accomplish the object by cleaning the apples with a wax solvent such, for instances, as carbon tetrachloride, denatured alcohol, methanol and gasoline. After treatment with any of these wax solvents, the fruit may be treated with a solution of one of the above named alkaline salts applied as a bath or spray or by dipping, followed by other similar baths in such number as may be necessary to completely remove all traces of such spray residues, emulsions, wax solvents etc., or such emulsions, wax solvents and spray residues may be removed by subjecting the fruit to a bath in pure water accompanied, if desired, by mechanical action of brushes, cloths, etc.

We have further discovered that a wax solvent such as described above may be made still more effective by the addition of an emulsifying agent such as dry spruce extract, soya bean flour, peanut flour, cottonseed meal flour to the water carrying the wax solvent.

We have further discovered that a wax solvent such as carbon tetrachloride etc. may be emulsified with a solution of alkaline salt such as trisodium phosphate with addition of an emulsifying agent such as dry spruce extract, soya bean flour, etc., and the whole used as a bath or in a succession of baths or sprays for the emulsifying of the wax of the apple, the loosening of the spray residues and their subsequent emulsification and removal from the apples or fruit.

After the spray residues, emulsions and natural wax of the apple or other fruit have been removed, it is necessary, as noted above, to replace the natural wax and seal the pores. It is a primary requisite of such coating that it shall contain or be of itself a fungicide so as to prevent or inhibit the growth of fungus and molds on the fruit, and act as a protective coating generally.

A further primary requisite of such coating is that it must be tasteless and harmless, and also cheap and easily applied. To this end we have discovered that treating paraffin with sodium thiosulphate in such a manner as to incorporate colloidal sulphur is not only entirely satisfactory for fruit but also for many other products.

The precise order in which the steps may be taken as respects the treatment of the emulsifying agent such as trisodium phosphate and the step involving the natural wax coating dissolving agent such as carbon tetrachloride is immaterial,—either one of these may be first.

Also, it may be that in place of coating the fruit with sulphurized paraffin, the fruit may be placed in a container in which the air pressure has been reduced, or the fruit may be insulated from the air by appropriate wrapping material. These may all serve as substitutes for the wax coating, which coating is to be preferred.

We claim—

1. In the method of cleansing and preparing for storage and market, fruit after harvesting, said fruit having spray residue thereon, the step of treating the fruit with a solution of tri-sodium phosphate in water.

2. In the method of cleansing and preparing for storage and market, fruit after harvesting, said fruit having spray residue thereon, the step of treating the fruit with a solution of tri-sodium phosphate in water concentrations of from one per cent (1%) to ten per cent (10%).

3. A cleanser for fruit after harvesting, said fruit having spray residue thereon, which cleanser embodies tri-sodium phosphate.

4. In the method of cleansing and preparing for storage and market, fruit after harvesting, said fruit having spray residue thereon, the step of treating the fruit with a solution of alkaline salts, one of which alkaline salts is a salt which acts as an emulsifying agent in conjunction with the oily and waxy components of said spray residue to be removed from the fruit.

5. In the method of cleansing and preparing for storage and market, fruit after harvesting, said fruit having spray residue thereon, the step of treating the fruit with a solution of alkaline salts, one of which alkaline salts is tri-sodium phosphate.

6. In the method of cleansing and preparing for storage and market, fruit after harvesting, said fruit having spray residue thereon, the step of treating the fruit with a solution of alkaline salts of a pH of less than 13, one of which alkaline salts is a salt which acts as an emulsifying agent in conjunction with the oily and waxy components of said spray residue to be removed.

7. In the method of cleansing and preparing for storage and market, fruit after harvesting, said fruit having spray residue thereon, the step of treating the fruit with a solution of alkaline salts of a pH of less than 13, one of which alkaline salts is tri-sodium phosphate.

8. A cleanser for fruit after harvesting, said fruit having spray residue thereon, which cleanser comprises alkaline salts, one of which salts acts as an emulsifying agent in conjunction with the oily and waxy components of said spray residue to be removed from the fruit.

In witness whereof we hereunto subscribe our names this 6th day of October, A. D. 1926.

IRVING F. LAUCKS.
HARRY P. BANKS.
HUGH F. RIPPEY.